Figures 1, 2, 3:
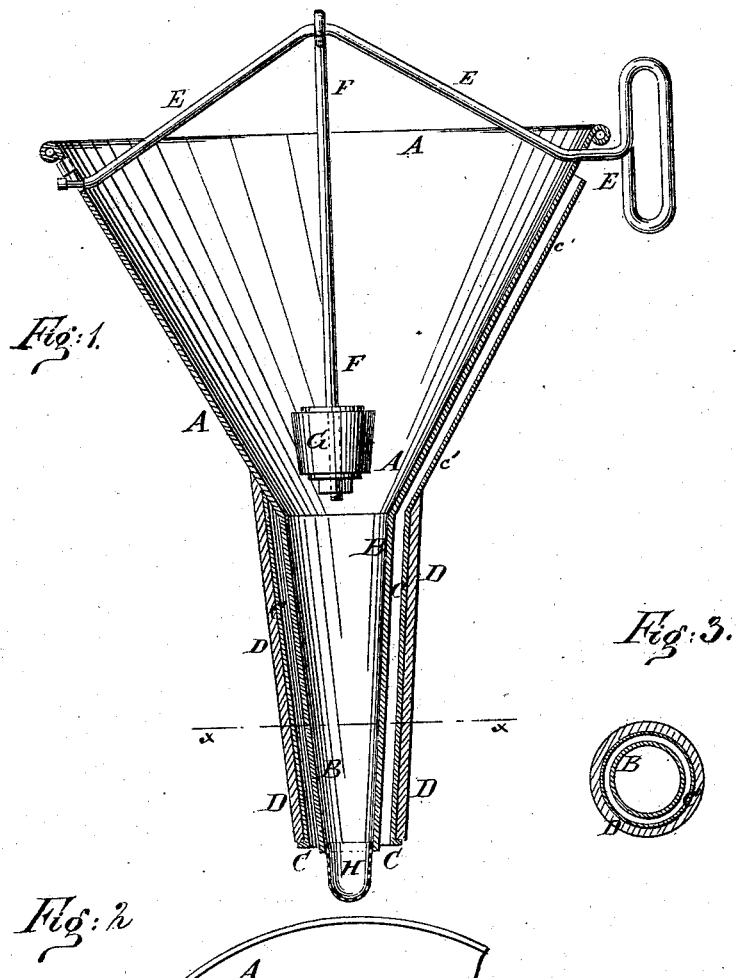

D. WILLIAMS.
Funnel.

No. 201,472. Patented March 19, 1878

WITNESSES:
Chas. Nida
C. Sedgwick

INVENTOR:
D. Williams
BY Munn & Co.
ATTORNEYS.

UNITED STATES PATENT OFFICE.

DANIEL WILLIAMS, OF WEST PHILADELPHIA, PENNSYLVANIA.

IMPROVEMENT IN FUNNELS.

Specification forming part of Letters Patent No. 201,472, dated March 19, 1878; application filed January 30, 1878.

*To all whom it may concern:*

Be it known that I, DANIEL WILLIAMS, of West Philadelphia, in the county of Philadelphia and State of Pennsylvania, have invented a new and useful Improvement in Funnels, of which the following is a specification:

Figure 1 is a vertical section of my improved funnel. Fig. 2 is a top view of the same, part being broken away to show the construction. Fig. 3 is a cross-section of the nozzle, taken through the line $x\,x$, Fig. 1.

Similar letters of reference indicate corresponding parts.

The object of this invention is to furnish an improved funnel which shall be so constructed that it may be used for filling opaque vessels without danger of spilling any of the liquid, either by its running over or when removing the funnel from the filled vessel.

The invention will first be described in connection with the drawing, and then pointed out in the claim.

A represents the body, and B the nozzle, of the funnel, which are constructed in the usual way. The nozzle B is surrounded with another nozzle, C, made concentric therewith, and larger, so as to form an air-space between the two nozzles. The upper edge of the nozzle C is secured to the outer side of the body A, and upon one side a concaved or semi-tubular strip, $c'$, extends up along the side of the said body A nearly to its top, and has its edges secured to said body. By this arrangement the air from the vessel can escape freely while the liquid is flowing into it.

The outer nozzle C is covered with vulcanized rubber D, or other suitable pliable material, so that the funnel may fit into the mouth of the vessel air-tight, and may thus prevent the liquid from flowing out around the nozzle when the vessel becomes full.

The lower edge of the outer nozzle C is bent outward beneath the lower edge of the rubber shell D, to prevent the said rubber from slipping down.

In holes in the sides of the upper part of the body A of the funnel works a crank, E, which has a T or other shaped handle formed upon one end. To the crank E is pivoted the upper end of a rod, F, which has a stopper, G, secured to its lower end by a collar, washer, and nut, or by other suitable means. The stopper G is made of such a size as to fit into the inner nozzle B, so that when the vessel is filled, which is shown by the liquid remaining in the funnel, by turning the crank E in one direction, the stopper G will be forced down into the nozzle B, and will close it tightly, so that the funnel may be removed from the vessel to the measure, or to another vessel, without spilling any of the liquid. By turning the crank E in the other direction the stopper will be withdrawn from the nozzle B and the liquid allowed to flow out.

H is a cup-shaped strainer, which is dropped into the nozzle B from its upper end, and which may be made of such a size as to lodge in any desired part of the nozzle. The strainer may be removed, when desired, by pushing it out from the lower end of the said nozzle.

Having thus described my invention, I claim as new and desire to secure by Letters Patent—

The hand-rod E, journaled in funnel A, and the rod F, pivoted at an equal distance from said journals in the obtuse angle of said hand-rod, in combination with a tapering cork, G, and nozzle B, for the purpose specified.

DANIEL WILLIAMS.

Witnesses:
HENRY CLAY CANN,
FRANK MONTGOMERY.